Figure 4:
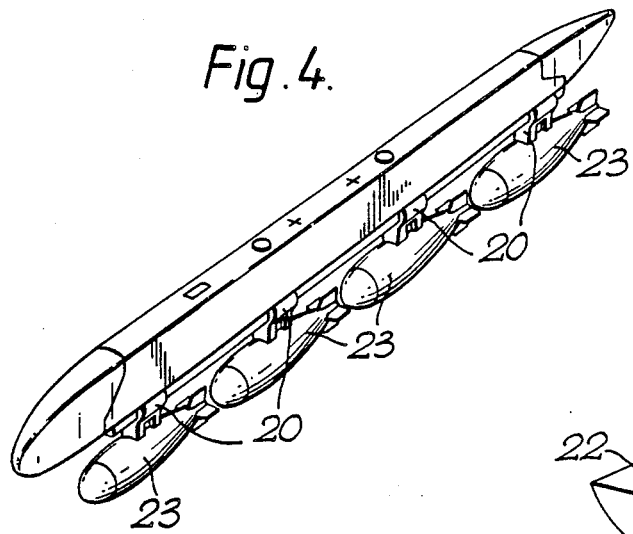

United States Patent [19]

Griffin et al.

[11] Patent Number: 4,926,740

[45] Date of Patent: May 22, 1990

[54] LAUNCHERS FOR AIRBORNE MISSILES

[75] Inventors: Dennis Griffin; John R. Pearce, both of Surrey, England

[73] Assignee: Frazer-Nash Defence Systems Limited, England

[21] Appl. No.: 326,227

[22] Filed: Mar. 20, 1989

Related U.S. Application Data

[63] Continuation of Ser. No. 139,774, Dec. 30, 1987, abandoned.

[30] Foreign Application Priority Data

Dec. 31, 1986 [GB] United Kingdom ............... 8631067

[51] Int. Cl.$^5$ .................. F41F 3/04; F41F 3/052; F41F 3/06; F41F 7/00
[52] U.S. Cl. .................................. 89/1.819; 89/1.58
[58] Field of Search ............ 89/1.56, 1.58, 1.819, 89/1.8

[56] References Cited

U.S. PATENT DOCUMENTS

| | | | |
|---|---|---|---|
| 4,347,777 | 9/1982 | Jakubowski et al. | 89/1.58 |
| 4,660,456 | 4/1987 | Griffin et al. | 89/1.819 |
| 4,711,151 | 12/1987 | Griffin et al. | 89/1.819 |
| 4,802,400 | 2/1989 | Griffin et al. | 89/1.819 |

Primary Examiner—David H. Brown
Attorney, Agent, or Firm—Howard L. Rose

[57] ABSTRACT

A rail-type airborne missile launcher having a main launcher body for fixed attachment to an aircraft, and a sub-rail removably attachable to the underside of the launcher body to carry a missile, is further provided with individual hook modules that can be attached to the underside of the launcher body, when the sub-rail is removed, at selected locations along the launcher body to carry a variety of stores. Such hook modules can each carry a separate respective store or they can be employed as an oppositely-facing pair at a selected distance apart to both carry a single store. In the former case, the hooks will be operable separately, such as by electromagnetic means, for separate release of the stores; but in the latter case both hooks will be arranged to release simultaneously.

10 Claims, 5 Drawing Sheets

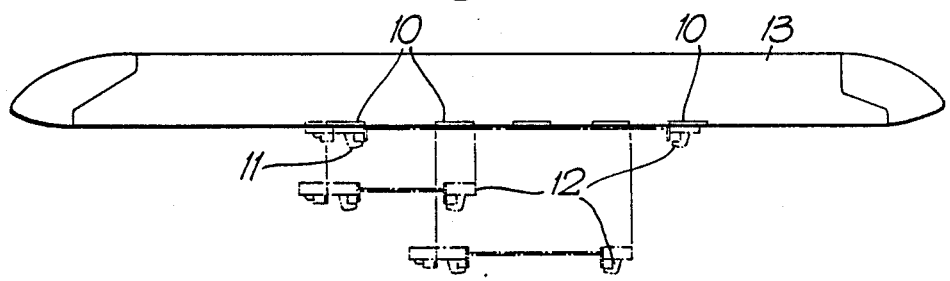
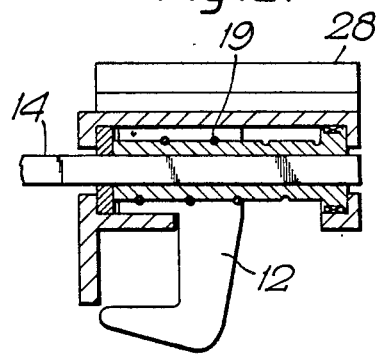
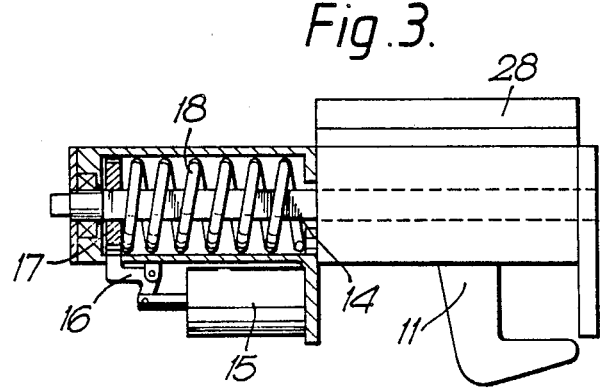

LAUNCHERS FOR AIRBORNE MISSILES

This is a continuation of application Ser. No. 07/139,774, filed Dec. 20, 1987, now abandoned.

This invention relates to rail launchers for airborne missiles.

In U.S. Pat. Nos. 4,660,456 and 4,711,151 to Griffin and Field, both assigned to the assignees of the present invention and incorporated herein by reference, there are featured rail launchers which enable a number of different types of raillaunched missile to be interfaced to the same pylon on an aircraft. This is achieved using a removable sub-rail which has a common load-transferring structural interface to the main launcher body and a second interface specifically tailored to suit the missile for which the sub-rail is designed.

From this has been developed a rail jettison system as described in U.S. Pat. No. 4,802,400 to Griffin and Delves, likewise assigned to the assignees of the present invention.

The present invention provides further improvements usable in the common weapons release systems described in the foregoing patent specifications.

According to one aspect of the invention, a pair of detachable hook modules are provided adapted to fit on the sub-rail interface of the launcher body at different selected longitudinal spacings. Actuating means can be provided for releasing both hooks simultaneously, while permitting relative longitudinal adjustment of the hook modules to a number of different standard spacings.

According to another aspect, a plurality of independent electro-mechanical release units are provided adapted to be mounted at different positions along the sub-rail interface of the launcher body, thereby to convert it to a multiple store carrier and release device.

According to a third aspect, a different interfacing arrangement is provided for light and heavy missiles, which serves to prevent heavy missiles from being fitted on to launchers and pylons only capable of carrying light missiles.

Figure 5:
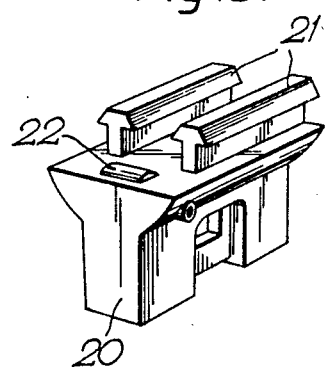
Figure 6:
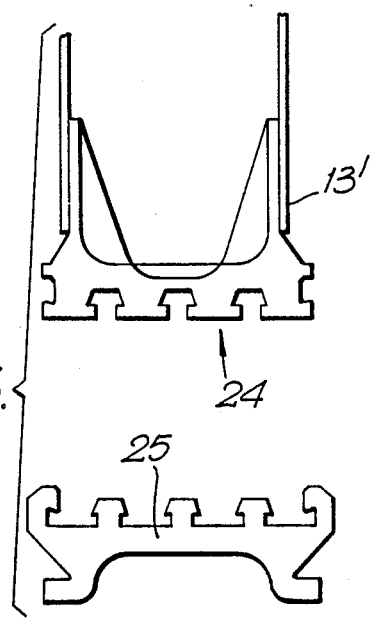
Figure 7:
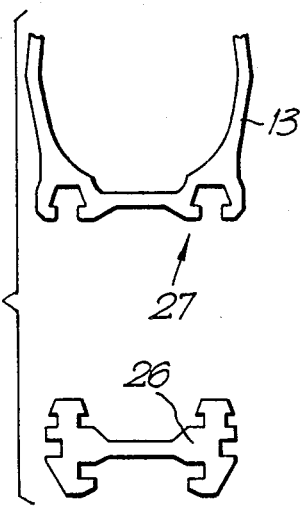

Arrangement according to the invention will now be described by way of example, with reference to the accompanying drawings, in which:

FIG. 1 is diagrammatic side elevation of a missile launcher body with a pair of detachable hook modules, FIGS. 2 and 3 are respectively sectional side elevations of the aft and forward hook modules of FIG. 1, FIG. 4 is a pictorial view of a launcher body fitted with multiple detachable release units to carry multiple stores, FIG. 5 is a pictorial view of one of the release units of FIG. 4, and FIGS. 6 and 7 are cross-sectional diagrams of two launcher body and detachable sub-rail combinations with different body/sub-rail interfaces.

The sub-rail interface along the main body of the launcher provides a well-defined structural interface that can be used for other purposes. Two modules can be fitted containing hooks that can be used to suspend a store on bail lugs at 10 inch, 14 inch or 13 inch centres depending on where the hook modules are positioned along the rail interface. The simultaneous release of the two suspension hooks can be accomplished by rotation of an actuating shaft which runs along the body and through the hook modules. By sliding the hook modules along this shaft, the hooks can be set at 10, 14 or 30 inch spacings as required.

FIG. 1 shows two such hook modules 11, 12 and their longitudinal positioning along the launcher body 13, with engagement locations 10 providing hook spacings at 10 inches, 14 inches and 30 inches. FIGS. 2 and 3 show the common actuating shaft 14 operated by an actuator on the forward hook module 11 which actuator comprises a solenoid 15 that releases a sear lever 16, normally engaged in the teeth of a cog wheel 17 on the shaft 14, to enable the shaft to be rotated by a torsion spring 18. At each hook module, suspended on the launcher body 13 by a slidable hanger 28, the rotary motion of the shaft 14 is converted to linear motion of the hook by a helical ball thread 19.

Other actuator arrangements are, of course,

Various mechanisms can be incorporated into the hook modules to give the desired hook movements within the geometric constraints of the layout. Whatever arrangement is used, it is important to ensure that synchronism in the operation of the two hooks is always achieved. While the hooks shown are for use with bail lugs on the store, the hooks can be double-nibbed for use with stores fitted with saddle lugs of the MACE type.

Referring now to FIGs. 4 and 5, the launcher body 13 is shown carrying a number of identical independent electro-mechanical hook modules or release units 20 each with a special body mounting which is compatible with the rail interface. The units 20 can incorporate a mechanism of known design, with the body of the unit being provided with integral double T lugs 21 to fit the interface. A clamping device enables each unit to be locked against longitudinal motion: as shown, a cam arrangement 22 is used to force the 'T' shaped lugs 21 into contact with the launcher body slots and hence lock the unit in position. The number of units and their longitudinal spacing can be chosen to suit the size of the stores, which may, for instance, be practice bombs 23.

The weight of missiles currently in use varies considerably and to carry the load of heavy missiles (e.g. Harm, Exocet, Sea Eagle, etc.) the design stresses in the launcher body and/or pylon have to be calculated accordingly. In such a case it has been found that a double T rail interface is inadequate. FIG. 6 shows a triple T interface 24 on a launcher body 13' designed to receive a sub-rail 25 to carry a heavy missile. The light missile launcher body 13 and sub-rail 26, with the double T interface 27, is shown in FIG. 7. The outer T's of the triple interface 24 are the same as the double T interface 27. This has the advantage that a heavy missile pylon or launcher is configured to take triple T rails designed for heavy weight stores and will also accept all the double T rails for the lightweight stores. However, a lightweight pylon or launcher with a double T interface cannot be fitted with a triple T rail, thus preventing the carriage of heavy stores on lightweight launchers.

We claim:

1. A convertible rail launcher to carry airborne missiles or other airborne stores, comprising:
    an elongated main launcher body for attachment to an aircraft to lie in a direction generally fore and aft of the aircraft,
    a plurality of individual hook modules including a first cooperating attachment member at the top thereof each said hook module including a releasable suspension hook for carrying an airborne store, hook-operating means for selectably releasing the hook to cause it to drop a store carried thereby, interface means for supporting and securing said hook modules on said launcher body along the underside thereof said interface means including a second cooperating attachment member where said first and second attachment members cooperate to effect releasable attachment of the hook modules to the launcher body at selected positions along said interface means, and a missile carrying sub-rail capable of substitution for the hook modules on said interface upon removal of said hook modules, said sub-rail including a first cooperating attachment member at the top thereof.

2. A launcher apparatus according to claim 1, wherein said interface means along the underside of said main launcher body comprises at least a pair of longitudinal tracks.

3. Launcher apparatus according to claim 2, wherein the individual hook modules are adapted to carry respective individual stores at intervals along the launcher body and said first cooperating attachment means are suspension hangers to engage in said longitudinal tracks at the underside of the launcher body, and locking means for locking each hook module at a selected location along the tracks.

4. Launcher apparatus according to claim 3, wherein said hook-operating means comprises respective electromagnetic release means for each hook module.

5. Launcher apparatus according to claim 2, wherein the hook modules are two in number and form an oppositely facing pair for location on said longitudinal tracks at the underside of the launcher body at a selected one of a plurality of available spacing distances.

6. Launcher apparatus according to claim 5, wherein the hook-operating means comprises a rotary shaft connecting the pair of modules and motive means on one module for rotating the shaft, there being an operative connection between the shaft and each hook for converting rotary motion of the shaft into translational motion of the hook.

7. Launcher apparatus according to claim 6, wherein said motive means comprises a spring which rotates the shaft when released by release means.

8. Launcher apparatus according to claim 2 or claim 3 or claim 5 wherein said longitudinal tracks on the launcher body comprise two or three parallel longitudinal T-slots at the underside of the launcher body to receive two or three corresponding T-rails along the top of the sub-rail, which T-rails constitute said first cooperating attachment means on the sub-rail.

9. Launcher apparatus according to claim 8, wherein a plurality of launcher bodies and a plurality of sub-rails are provided both each of two types having respectively two and three T-slots and two and three T-rails, a two T-slot body only being capable of receiving a two T-rail sub-rail whereas a three T-slot body can receive both three t-rail and two T-rail sub-rails.

10. An improved convertible launcher apparatus for carrying airborne missiles or other airborne stores, including an elongated main launcher body for attachment to an aircraft to lie in a direction generally fore and aft of the aircraft, with interface carrying means on the launcher body along the underside thereof capable of supporting a missile-carrying sub-Rail releasably attachable to the main launcher body at the underside of said body, with mounting interface means on said sub-rail at the upper side thereof adapted to co-operate with said interface means on the main launcher body to effect releasable attachment of the sub-rail to the launcher body, the improvement comprising:

a plurality of individual hook modules releasably attachable to the interface means of the main launcher body at the underside of said body, each said hook module including a releasable suspension hook for carrying an airborne store and hook-operating means for selectably releasing the hook to cause it to drop a store carried thereby, a first cooperating attachment element associated with the interface means on the underside thereon, a second cooperating attachment element each said hook module at the top thereof adapted to cooperate with said first attachment element, where engagement of said first and second cooperating attachment elements effect releasable attachment of the hook modules to the launcher body at selected positions along the interface means.

* * * * *